(12) United States Patent
Nakamura (10) Patent No.: US 8,929,618 B2
(45) Date of Patent: Jan. 6, 2015

(54) FAKE-FINGER DETERMINATION DEVICE (75) Inventor: Yoichi Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 100 days.

(21) Appl. No.: 13/514,226

(22) PCT Filed: Nov. 10, 2010

(86) PCT No.: PCT/JP2010/069991
§ 371 (c)(1),
(2), (4) Date: Jun. 6, 2012

(87) PCT Pub. No.: WO2011/070886
PCT Pub. Date: Jun. 16, 2011

(65) Prior Publication Data
US 2012/0237091 A1 Sep. 20, 2012

(30) Foreign Application Priority Data
Dec. 7, 2009 (JP) ................... 2009-277655

(51) Int. Cl.
G06K 9/00 (2006.01)
G06T 1/00 (2006.01)
(52) U.S. Cl.
CPC .... *G06T 1/00* (2013.01); *G06K 9/00* (2013.01)
USPC ........... 382/124; 382/100; 382/115; 382/210; 382/218; 382/304; 382/305
(58) Field of Classification Search
CPC ....... G06F 3/017; G06F 21/32; G06F 3/0428; G06F 3/04883; G06F 3/03547; G06F 3/0426; G06F 3/0304; G06F 2203/0338; G06F 3/0414; G06F 3/04815; G06F 3/0488; G06F 2203/0331; G06F 3/0338; G06K 2009/0006; G06K 9/00107; G06K 9/00026; G06K 9/6878; A61B 5/117; A61B 2017/00438; G01R 33/465; G01R 3/0426; G06T 1/00; H03K 17/9622; G03G 2221/1639; G05G 2009/04755

USPC .......................... 382/100, 115, 124, 210, 218
See application file for complete search history.

(56) References Cited

U.S. PATENT DOCUMENTS 4,394,773 A * 7/1983 Ruell ............................ 382/124
7,356,169 B2 * 4/2008 Hamid .......................... 382/124
(Continued)

FOREIGN PATENT DOCUMENTS

JP 2006-318018 A 11/2006
JP 2007-511845 A 5/2007
(Continued)

OTHER PUBLICATIONS

Office Action dated Jul. 23, 2013, issued by Korean Intellectual Property Office of Republic of Korea in counterpart Korean application No. 10-2012-7014592.

(Continued)

*Primary Examiner* — Vu Le
*Assistant Examiner* — Aklilu Woldemariam
(74) *Attorney, Agent, or Firm* — Sughrue Mion, PLLC (57) ABSTRACT Fingerprint images that are required for fake-finger determination can be acquired with a single input operation, and the user-friendliness and the determination accuracy of a fake-finger are improved. This device has moving means for moving a sensor surface, on which a finger as a determination object is placed, relatively to the finger, sensing means for acquiring fingerprint images of the finger before and after the sensor surface is moved, derivation means for obtaining a deformation level of the fingerprint before and after the sensor surface is moved based on two types of fingerprint images obtained by the sensing means, storage means for storing a deformation threshold related to the deformation level of the fingerprint to determine whether the finger on the sensor surface is a real finger or a fake-finger, and determination means for determining whether the finger placed on the sensor surface is a real finger or a fake-finger based on comparison results of the deformation level of the fingerprint obtained by the derivation means and the deformation threshold.

5 Claims, 10 Drawing Sheets

(56) References Cited

U.S. PATENT DOCUMENTS

| | | | |
|---|---|---|---|
| 7,519,205 B2* | 4/2009 | Chou | 382/124 |
| 7,809,168 B2* | 10/2010 | Abiko et al. | 382/115 |
| 8,165,355 B2* | 4/2012 | Benkley et al. | 382/124 |
| 8,411,140 B2* | 4/2013 | Adelson | 348/135 |
| 2003/0007670 A1* | 1/2003 | Hamid | 382/124 |
| 2003/0091724 A1* | 5/2003 | Mizoguchi | 427/1 |
| 2004/0125994 A1* | 7/2004 | Engels et al. | 382/124 |
| 2004/0131237 A1* | 7/2004 | Machida | 382/124 |
| 2007/0071291 A1* | 3/2007 | Yumoto et al. | 382/124 |
| 2008/0013805 A1* | 1/2008 | Sengupta et al. | 382/124 |
| 2008/0137920 A1* | 6/2008 | Miura et al. | 382/124 |
| 2008/0219521 A1* | 9/2008 | Benkley et al. | 382/124 |
| 2008/0226135 A1* | 9/2008 | Mainguet et al. | 382/115 |
| 2008/0231612 A1* | 9/2008 | Hill et al. | 345/177 |
| 2008/0310691 A1* | 12/2008 | Yun et al. | 382/125 |
| 2009/0074263 A1* | 3/2009 | Higuchi | 382/126 |
| 2009/0232367 A1 | 9/2009 | Shinzaki | |
| 2009/0245596 A1* | 10/2009 | Niinuma | 382/124 |
| 2010/0164886 A1* | 7/2010 | Nakamura | 345/173 |
| 2010/0214242 A1* | 8/2010 | Casiez et al. | 345/173 |
| 2011/0029185 A1* | 2/2011 | Aoki et al. | 701/29 |

FOREIGN PATENT DOCUMENTS

| | | |
|---|---|---|
| JP | 2007-249950 A | 9/2007 |
| JP | 2009-271948 A | 11/2009 |
| KR | 1020070096739 A | 10/2007 |
| WO | 2005/050540 A1 | 6/2005 |
| WO | 2005/069212 A1 | 7/2005 |

OTHER PUBLICATIONS

International Search Report of PCT/JP2010/069991 dated Dec. 28, 2010.

* cited by examiner

Fig. 10 ically different. For example, a fake-finger
FAKE-FINGER DETERMINATION DEVICE

CROSS REFERENCE TO RELATED APPLICATIONS

This application is a National Stage of International Application No. PCT/JP2010/069991 filed Nov. 10, 2010, claiming priority based on Japanese Patent Application No. 2009-277655 filed Dec. 7, 2009, the contents of all of which are incorporated herein by reference in their entirety.

BACKGROUND ART

The present invention relates to a fake-finger determination device or the like suitable for recognizing a fake-finger.

In recent years, fingerprint authentication is attracting attention as one type of authentication system for identifying individuals. A fingerprint is unique in that it is different for every person, and that it does not change even with the lapse of time. Accordingly, it is said that fingerprint authentication is more reliable than the currently prevalent password authentication or the like. Meanwhile, with fingerprint authentication, it is necessary to prevent fraudulent acts of someone acquiring and forging the fingerprint of another person and using a fake-finger or the like to impersonate that person.

As a method of recognizing a fake-finger, for instance, proposed is a method of using a reed-shaped sweep-type sensor, causing the finger placed on a sensor to slide in two directions; namely, front and back (fingertip direction and finger base direction) at a constant speed, confirming whether the difference (that is, the deformation amount) between the two obtained fingerprint images falls within the normal range of the deformation amount that is obtained when a real finger of a human being is used, and thereby determining whether or not the finger to be recognized is a fake-finger (for example, refer to Patent Document 1).

Patent Document 1: Japanese Translation of PCT Application No. 2007-511845

Nevertheless, with the method disclosed in Patent Document 1, the test subject is required to perform two input operations (that is, operations of sliding one's finger in two directions; namely, front-and-back directions relative to the sweep-type sensor), and there is a problem in that this deteriorates the user-friendliness.

In addition, when using a sweep-type sensor, the test subject is required to slide one's finger at a constant speed. This causes variance such as individual differences in relation to the deformation of the fingerprint image, and the determination accuracy may deteriorate.

SUMMARY

The present invention was devised in view of the foregoing circumstances, and an object of this invention is to provide a fake-finger determination device capable of acquiring fingerprint images that are required for fake-finger determination with a single input operation, and improving the user-friendliness and the determination accuracy of a fake-finger.

The determination object sensing device according to the present invention comprises moving means for moving a sensor surface, on which a finger as a determination object is placed, relatively to the finger, and sensing means for acquiring fingerprint images of the finger before and after the sensor surface is moved.

Moreover, the fake-finger determination device according to the present invention is a fake-finger determination device including the foregoing determination object sensing device, and comprises derivation means for obtaining a deformation level of the fingerprint before and after the sensor surface is moved based on two types of fingerprint images obtained by the sensing means, storage means for storing a deformation threshold related to the deformation level of the fingerprint to determine whether it is a real finger or a fake-finger, and determination means for determining whether the finger placed on the sensor surface is a real finger or a fake-finger based on comparison results of the deformation level of the fingerprint obtained by the derivation means and the deformation threshold.

Moreover, the fake-finger determination method according to the present invention comprises a step of acquiring a fingerprint image of a finger, which is placed as a determination object on a sensor surface, before the sensor surface is moved, a step of moving the sensor surface relatively to the finger, a step of acquiring a fingerprint image of the finger placed on the sensor surface after the sensor surface is moved, a step of obtaining a deformation level of the fingerprint before and after the sensor surface is moved based on two types of fingerprint images before and after the sensor surface is moved, and a step of comparing the obtained deformation level of the fingerprint and a deformation threshold relating to the deformation level of the fingerprint, and determining whether the finger placed on the sensor surface is a real finger or a fake-finger based on comparison results.

According to the present invention, it is possible to acquire fingerprint images that are required for fake-finger determination with a single input operation, and improve the user-friendliness and the determination accuracy of a fake-finger.

DETAILED DESCRIPTION

The preferred embodiments of the fake-finger determination device according to the present invention are now explained with reference to the appended drawings.

A. Assumed Technical Concept

A fake-finger and a person's finger are of different hardness, and the deformation level of the fingerprint (artificial fingerprint for a fake-finger) when pressure is applied to the finger is considerably different. For example, a fake-finger made of material such as polyvinyl alcohol or polyvinyl acetate resin is harder than a person's finger, and the deformation level of the fingerprint when pressure is applied to the fake-finger is smaller in comparison to the deformation level of the fingerprint when the same pressure is applied to a person's finger. The present invention was devised in view of these characteristics of a fake-finger.

B. Embodiment (1) Configuration of Embodiment

Figure 1:
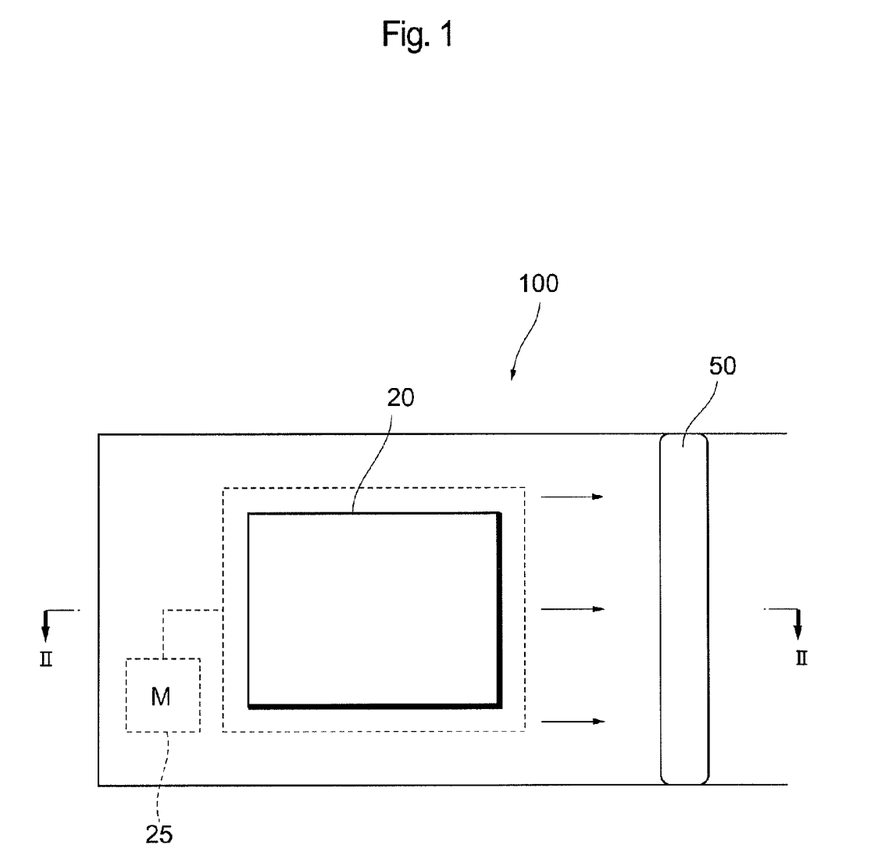
FIG. 1 is a plan view of the fake-finger determination device according to this embodiment.

The configuration of a fake-finger determination device 100 of this embodiment is foremost explained with reference to FIG. 1 and FIG. 2. FIG. 1 is a plan view of the fake-finger determination device when viewed from directly above, and FIG. 2 is a cross section of line II-II of FIG. 1.

The fake-finger determination device 100 is a device that is used for determining whether or not a determination object T, which is an object of fingerprint authentication, is a fake-finger.

Figure 2:
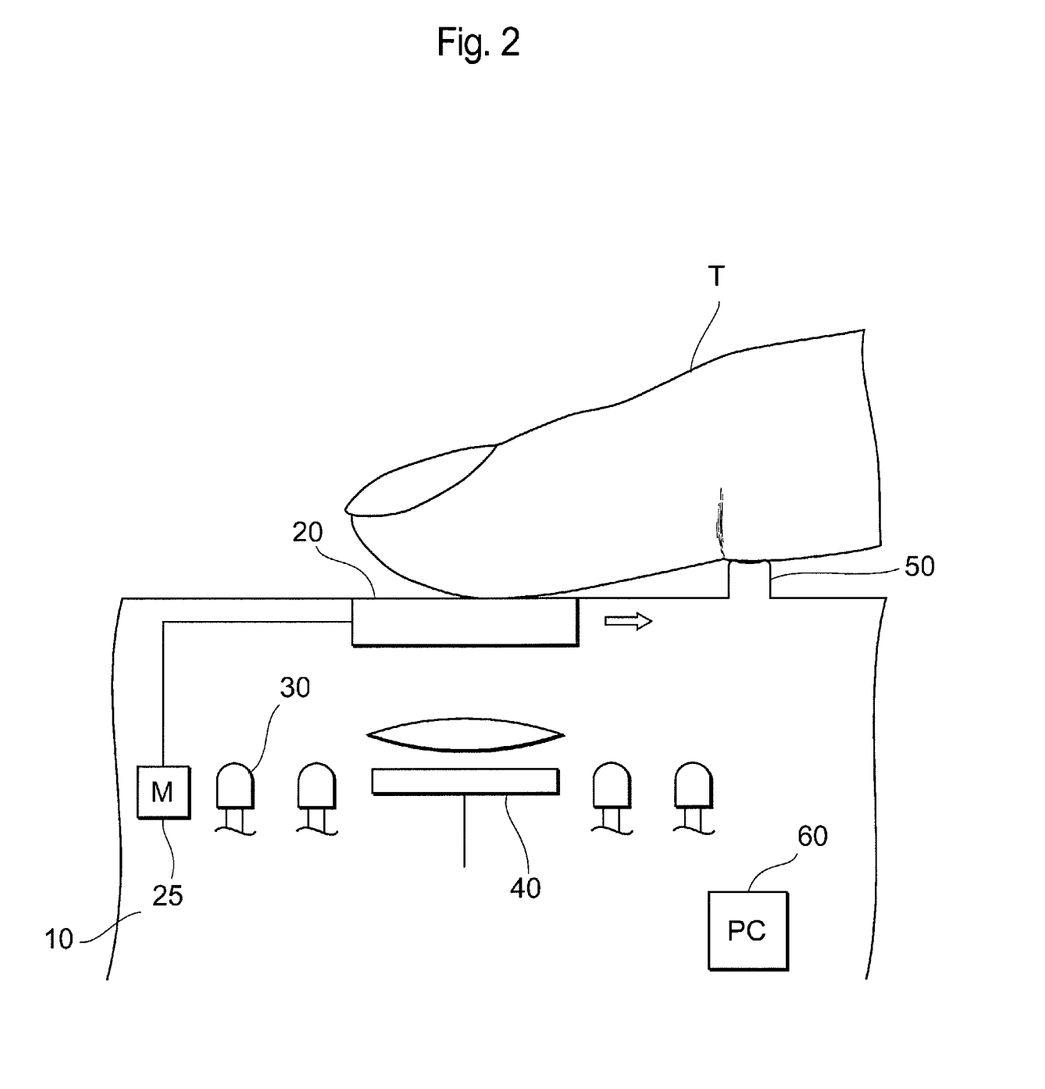
FIG. 2 is a cross section of line II-II of the fake-finger determination device shown in FIG. 1.

As shown in FIG. 1 and FIG. 2, the fake-finger determination device 100 comprises a housing 10, a sensor surface 20, a movement mechanism 25, a light source 30, an imaging device 40, a guide part 50, and a computer 60. The fake-finger determination device 100 according to this embodiment is particularly unique in that this device is provided with the movement mechanism 25 for moving the sensor surface 20. Note that, in the ensuing explanation, the side of the housing 10 to which the sensor surface 20 is provided is referred to as the upper side.

The sensor surface 20 is a surface where the determination object T (finger in this example) is to be placed, and is configured, for instance, from a fibre optic plate or the like. The sensor surface 20 can be moved by the movement mechanism 25 in a predetermined amount in a direction toward the base of the finger (refer to the direction shown with the white arrow in FIG. 2).

The movement mechanism (moving means) 25 is configured from a compact motor or the like, and is means for moving the sensor surface 20 at a predetermined speed and in a predetermined amount in a direction toward the base of the finger as the determination object T. The movement of the surface sensor 20 by the movement mechanism 25 is controlled by the computer 60. Note that the movement of the sensor surface 20 is explained in detail later, and the explanation thereof is omitted here.

The imaging device (sensing means) 40 is provided at the lower side of the sensor surface 20. The imaging device 40 performs reflected light sensing by using the light source 30 provided at the lower side of the housing 10, and takes an image of the finger as the determination object T that is placed on the sensor surface 20. In other words, the imaging device 40 takes an image of the determination object T placed on the sensor surface 20 via an objective lens or the like, and thereby obtains a fingerprint image in which the raised ridge of the skin is shown bright, and the valley line between the ridges is shown dark.

The guide part 50 inhibits the finger as the determination object T from moving together with the sensor surface 20 upon moving the sensor surface 20 by the movement mechanism 25. As shown in FIG. 1 and FIG. 2, the guide part 50 is provided to a position where an area around the first joint of the finger comes into contact therewith when the finger is placed on the sensor surface 20. In other words, the guide part 50 for fixing the finger placed on the sensor surface 20 is provided as an extension of a movement locus of the sensor surface 20. As a result of providing the guide part 50 at the foregoing position and fixing the finger at such location, it is possible to inhibit the finger from moving pursuant to the movement of the sensor surface 20 in a state where the finger is placed on the sensor surface 20.

The computer (derivation means) 60 is configured from a CPU (Central Processing Unit), a ROM (Read Only Memory), a RAM (Random Access Memory) and the like, and the CPU centrally controls the respective components of the fake-finger determination device 100 by executing the various control programs and the like stored in the ROM and the RAM.

Figure 3:
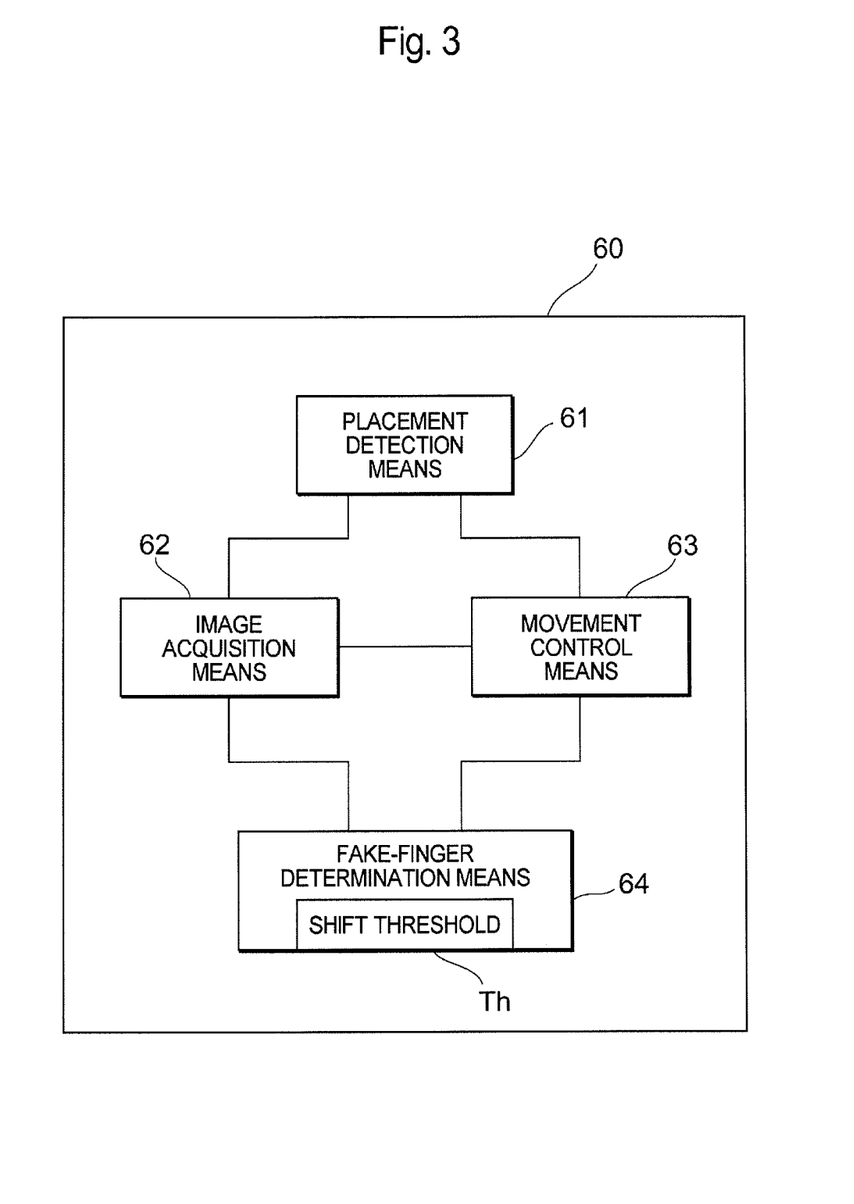
FIG. 3 is a diagram showing the functional block of the computer.

FIG. 3 is a functional block diagram of the computer 60. The computer 60 comprises placement detection means 61, image acquisition means 62, a movement control means 63, and fake-finger determination means 64.

The placement detection means 61 determines whether the determination object T has been placed on the sensor surface 20 based on the sensor signal that is output from a light quantity sensor (not shown) or the like. When the placement detection means 61 detects that the determination object T has been placed on the sensor surface 20, this means notifies the image acquisition means 62 and the movement control means 63 of such detection.

The image acquisition means (sensing means) 62 acquires the fingerprint images before and after the sensor surface 20 is moved. Specifically, upon receiving a notice from the placement detection means 61 to the effect that the finger as the determination object T has been placed on the sensor surface 20, the image acquisition means 62 uses the light source 30 and the imaging device 40 to perform reflected light sensing, and acquires the fingerprint image before the sensor surface 20 is moved (that is, the fingerprint image representing the fingerprint before deformation; hereinafter referred to as the "pre-deformation fingerprint image"). Meanwhile, when the image acquisition means 62 receives a notice from the movement control means 63 to the effect that the sensor surface 20 has moved, the image acquisition means 62 uses the light source 30 and the imaging device 40 to perform reflected light sensing, and acquires the image after the sensor surface 20 is moved (that is, the fingerprint image representing the fingerprint after deformation; hereinafter referred to as the "post-deformation fingerprint image"). The image acquisition means 62 outputs the acquired pre- and post-deformation fingerprint images to the fake-finger determination means 64.

The movement control means 63 controls the movement of the sensor surface 20 by the movement mechanism 25. Specifically, the movement control means 63 receives a notice from the placement detection means 61 to the effect that the determination object T has been placed on the sensor surface 20, and, upon receiving a notice from the fake-finger determination means 64 to the effect that the pre-deformation fingerprint image has been acquired, the movement control means 63 moves the sensor surface 20 at a predetermined speed (moving speed) and in a predetermined amount (shift) in a direction toward the base of the finger. When the sensor surface 20 is moved, the movement control means 63 notifies the image acquisition means 62 to the effect that the sensor surface 20 has moved. Note that the moving speed and shift of the movement mechanism 25 may be set to an optimal value that is obtained in advance based on testing in consideration of the deformation level of the fingerprint before and after the sensor surface 20 is moved.

The fake-finger determination means (derivation means, determination means) 64 determines whether or not the finger is a fake-finger by analyzing the pre- and post-deformation fingerprint images provided from the image acquisition means 62.

Here, when the sensor surface 20 is moved in a direction toward the base of the finger in a state where the determination object T (real finger or fake-finger) is placed on the sensor surface 20, the spacing of ridges will be narrower in the fingerprint near the fingertip in comparison to the fingerprint near the base of the finger, but the deformation level of the fingerprint will be smaller with a fake-finger in comparison to a real finger (refer to foregoing A. Assumed technical concept).

Figure 4:
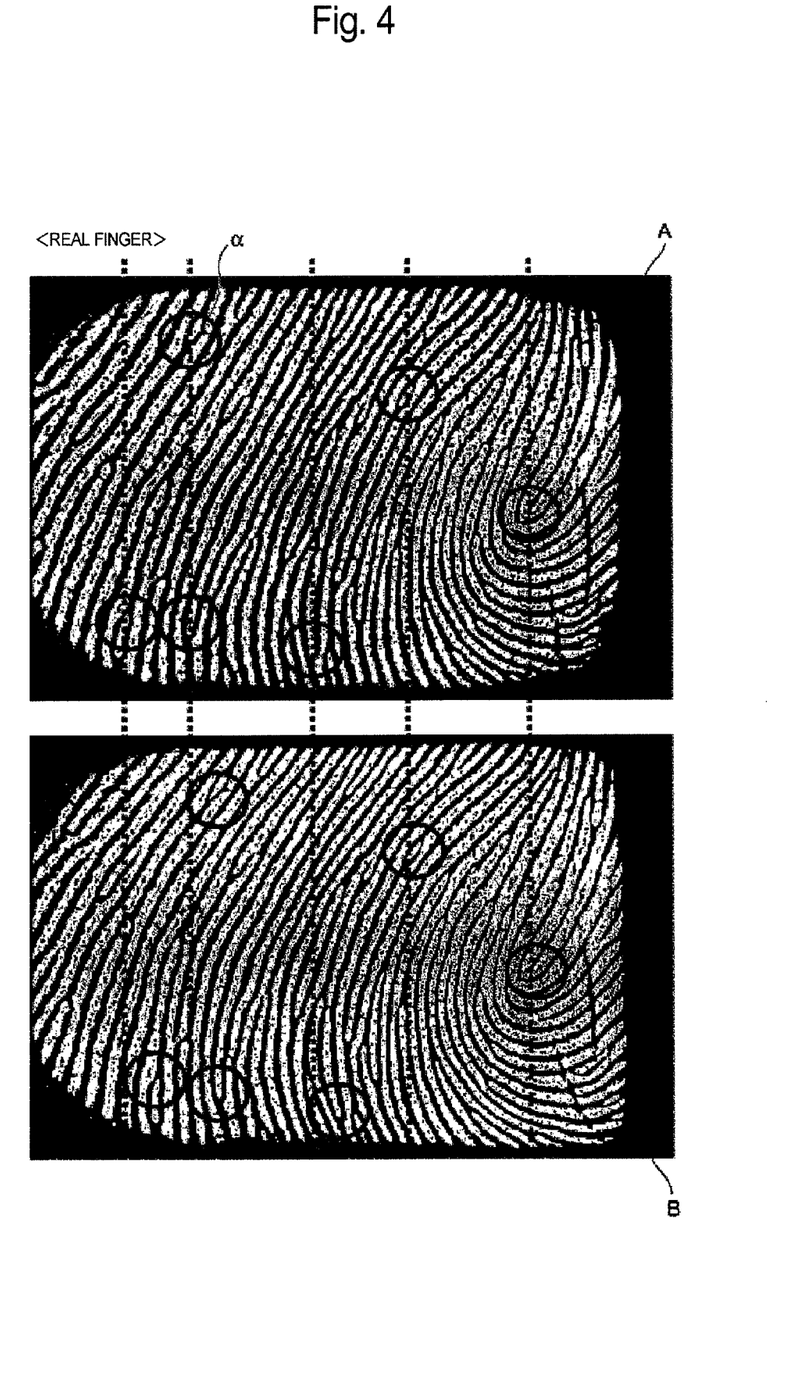
FIG. 4 is a diagram illustrating the fingerprint images before and after a real finger is deformed.
Figure 5:
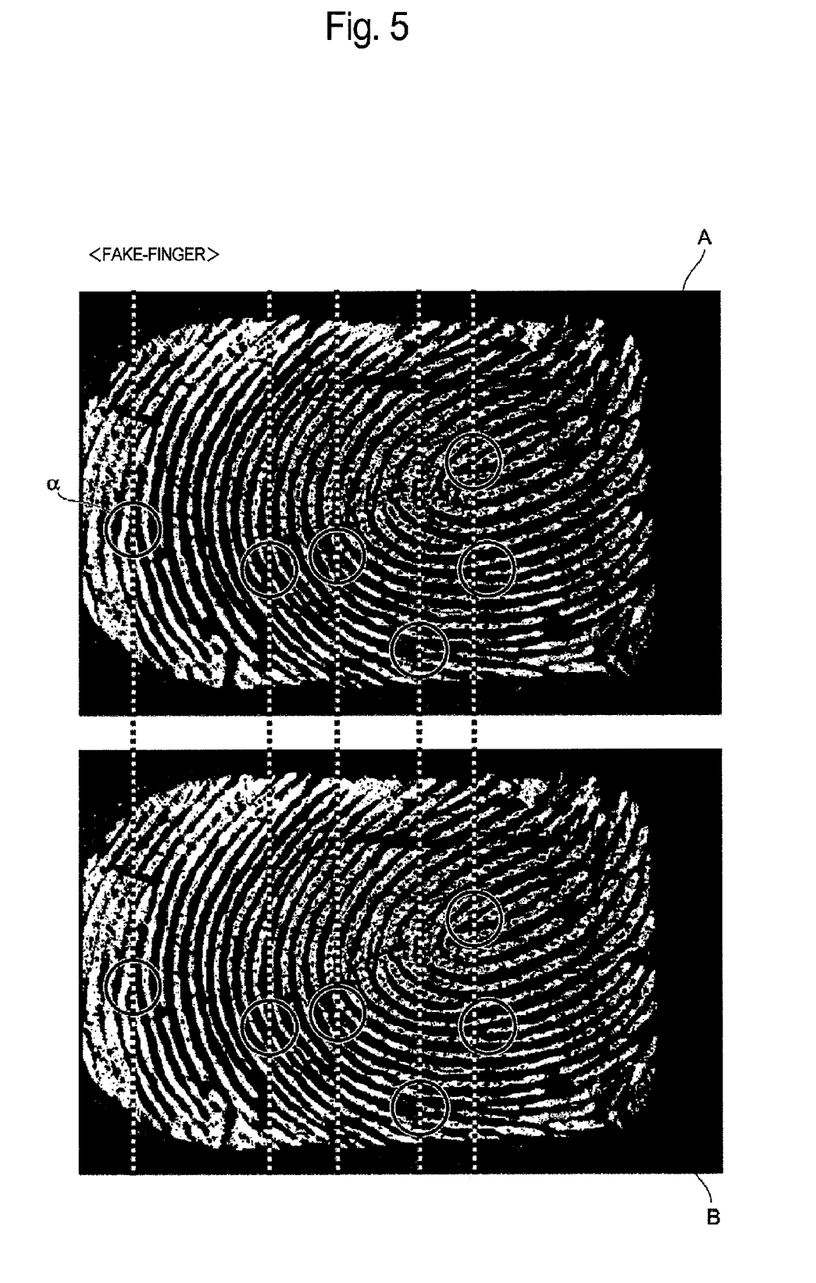
FIG. 5 is a diagram illustrating the fingerprint images before and after a fake-finger is deformed.

FIG. 4 is a diagram illustrating the pre- and post-deformation fingerprint images of a real finger, and FIG. 5 is a diagram illustrating the pre- and post-deformation fingerprint images of a fake-finger. Note that "A" shown in FIG. 4 and FIG. 5 illustrates the pre-deformation fingerprint image, and "B" shown in FIG. 4 and FIG. 5 illustrates the post-deformation fingerprint image. Moreover, the α portion in FIG. 4 and FIG. 5 illustrates the characteristic portion of the fingerprint (for example, portion including minutia such as the bifurcation or end point of the ridge).

As evident upon comparing A and B of FIG. 4, with the fingerprint obtained from a real finger, the characteristic portion α has moved considerably due to the deformation of the finger at the fingertip side. Meanwhile, with the fingerprint obtained from a fake-finger, as evident upon comparing A and B of FIG. 5, the characteristic portion α hardly moved. This is because the deformation of the fake-finger is small in comparison to a real finger.

The fake-finger determination means 64 extracts the characteristic portion α of the fingerprint by analyzing the fingerprint image supplied by the image acquisition means 62, and determines whether a shift Vm before and after deformation of the extracted characteristic portion α exceeds a shift threshold (deformation threshold) Th. The shift threshold Th is a threshold that is set in order to determine whether the determination object T is a fake-finger or a real finger, and is obtained in advance via testing. Note that, as another method, it is also possible to obtain a line spacing D of the moving direction at the characteristic portion α based on a frequency analysis, and determine whether the obtained line spacing D exceeds the set line spacing threshold Dh.

The fake-finger determination means 64 determines that the determination object T is a real finger when the shift Vm is not less than the shift threshold Th. Meanwhile, the fake-finger determination means 64 determines that the determination object T is a fake-finger when the shift Vm is less than the shift threshold Th. The operation of the fake-finger determination device 100 is now explained with reference to FIG. 6.

(2) Operation of Embodiment

Figure 6:
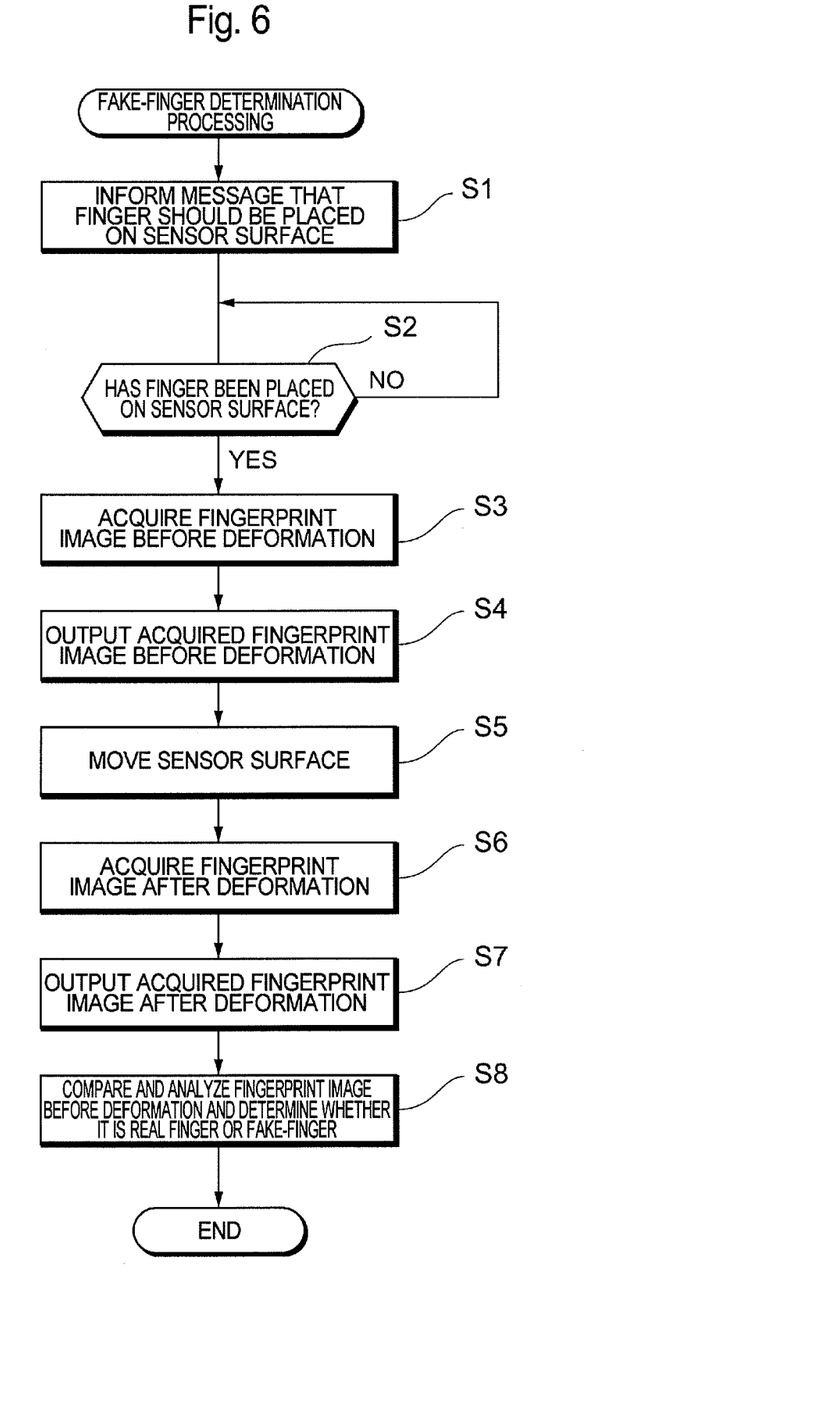
FIG. 6 is a flowchart showing the fake-finger determination processing.

The computer 60 of the fake-finger determination device 100 foremost notifies the test subject to place the determination object T (that is, his/her finger) on the sensor surface 20 (step S1).

In accordance with the message, the test subject places his/her finger on the sensor surface 20 so that the area around the first joint of the finger comes into contact with the guide part 50.

The placement detection means 61 of the computer 60 determines whether the determination object T has been placed on the sensor surface 20 based on the sensor signal that is output from a light quantity sensor (not shown) or the like (step S2). When the placement detection means 61 detects that the determination object T has been placed on the sensor surface 20 while repeatedly performing step S2 (step S2; YES), the placement detection means 61 notifies the image acquisition means 62 and the movement control means 63 of such detection.

When the image acquisition means 62 receives a notice from the placement detection means 61 to the effect that a finger as the determination object T has been placed on the sensor surface 20, the image acquisition means 62 uses the light source 30 and the imaging device 40 to perform reflected light sensing, and acquires a fingerprint image before the sensor surface 20 is moved (that is, the pre-deformation fingerprint image) (step S3). In addition, the image acquisition means 62 outputs the acquired pre-deformation fingerprint image to the fake-finger determination means 64 (step S4). When the fake-finger determination means 64 receives the pre-deformation fingerprint image, it notifies the movement control means 63 of the acquisition of the pre-deformation fingerprint image.

When the movement control means 63 receives a notice from the placement detection means 61 to the effect that the determination object T has been placed on the sensor surface 20 and a notice from the fake-finger determination means 64 to the effect that the pre-deformation fingerprint image has been acquired, the movement control means 63 moves the sensor surface 20 at a predetermined speed (moving speed) and in a predetermined amount (shift) in a direction toward the base of the finger (step S5). As described above, an optimal value obtained through testing may be used as the moving speed and the shift. When the sensor surface 20 is moved, the movement control means 63 notifies the image acquisition means 62 to the effect that the sensor surface 20 has moved.

When the image acquisition means 62 receives a notice from the movement control means 63 to the effect that the sensor surface 20 has moved, the image acquisition means 62 uses the light source 30 and the imaging device 40 to perform reflected light sensing, and acquires the post-deformation fingerprint image (step S6). The image acquisition means 62 outputs the acquired pre- and post-deformation fingerprint images to the fake-finger determination means 64 (step S7).

When the fake-finger determination means 64 receives the pre- and post-deformation fingerprint images from the image acquisition means 62, the fake-finger determination means 64 determines whether the finger as the determination object T is a real finger or a fake-finger by comparing and analyzing the received pre- and post-deformation fingerprint images (step S8). As described above, while the characteristic portion α moves considerably due to the deformation of the finger with the fingerprint obtained from a real finger (refer to A and B of FIG. 4), the characteristic portion α hardly moves since the deformation of a fake-finger is small in comparison to a real finger with the fingerprint obtained from a fake-finger (refer to A and B of FIG. 5).

The fake-finger determination means 64 uses the foregoing characteristics of a fake-finger to foremost analyze the fingerprint image that is supplied from the image acquisition means 62, and subsequently extracts the characteristic portion (for example, portion including minutia such as the bifurcation or end point of the ridge) α of the fingerprint. In addition, the fake-finger determination means 64 determines whether the shift Vm before and after deformation of the extracted characteristic portion α exceeds the shift threshold Th. As described above, the shift threshold Th is a threshold that is set in order to determine whether the determination object T is a fake-finger or a real finger, and is obtained in advance via testing. The fake-finger determination means 64 determines that the determination object T is a real finger when the shift Vm is not less than the shift threshold Th. Meanwhile, the fake-finger determination means 64 determines that the determination object T is a fake-finger when the shift Vm is less than the shift threshold Th. The foregoing processing is thereby ended.

When it is determined that the determination object T is a real finger, the computer 60 executes processing that is performed in cases where a positive result is obtained in the fake-finger determination (determination that the finger is a real finger), for instance, such as performing personal authentication by using the acquired fingerprint image. Meanwhile, when it is determined that the determination object T is a fake-finger, the computer 60 executes processing that is performed in cases where a negative result is obtained in the fake-finger determination (determination that the finger is a fake-finger), for instance, such as by displaying a warning message on a display (not shown) to the effect that the finger is a fake-finger.

As explained above, according to this embodiment, the fake-finger determination can be performed by the test subject only having to perform one input operation of placing one's finger on the sensor surface. Accordingly, in comparison to the conventional technology which required two input operations for performing the fake-finger determination (specifically, operations of sliding one's finger in two directions; namely, front-and-back directions relative to the sweep-type sensor), the user-friendliness can be improved.

In addition, with the conventional technology that uses a sweep-type sensor, the test subject is required to slide one's finger at a constant speed. This causes variance such as individual differences in relation to the deformation of the fingerprint image, and the determination accuracy may deteriorate. Meanwhile, with this embodiment, rather than the test subject moving one's finger, deformed fingerprint images can be obtained by using the movement mechanism to move the sensor surface. Thus, it is possible to inhibit variance such as individual differences, and thereby improve the determination accuracy.

C. Modified Examples (1) The foregoing embodiment explained a case where the sensor surface 20 is moved in a direction toward the base of the finger. However, for instance, as shown with the arrow in FIG. 7, the sensor surface 20 may also be moved in the direction toward the fingertip. Needless to say, in addition to the longitudinal direction of the finger (X direction shown in FIG. 7), the sensor surface 20 may also be moved in the horizontal direction of the finger (Y direction shown in FIG. 7), or in the vertical direction of the finger (Z direction shown in FIG. 7). Furthermore, the sensor surface 20 can also be rotated (for instance, rotated around the X axis shown in FIG. 7).

Figure 7:
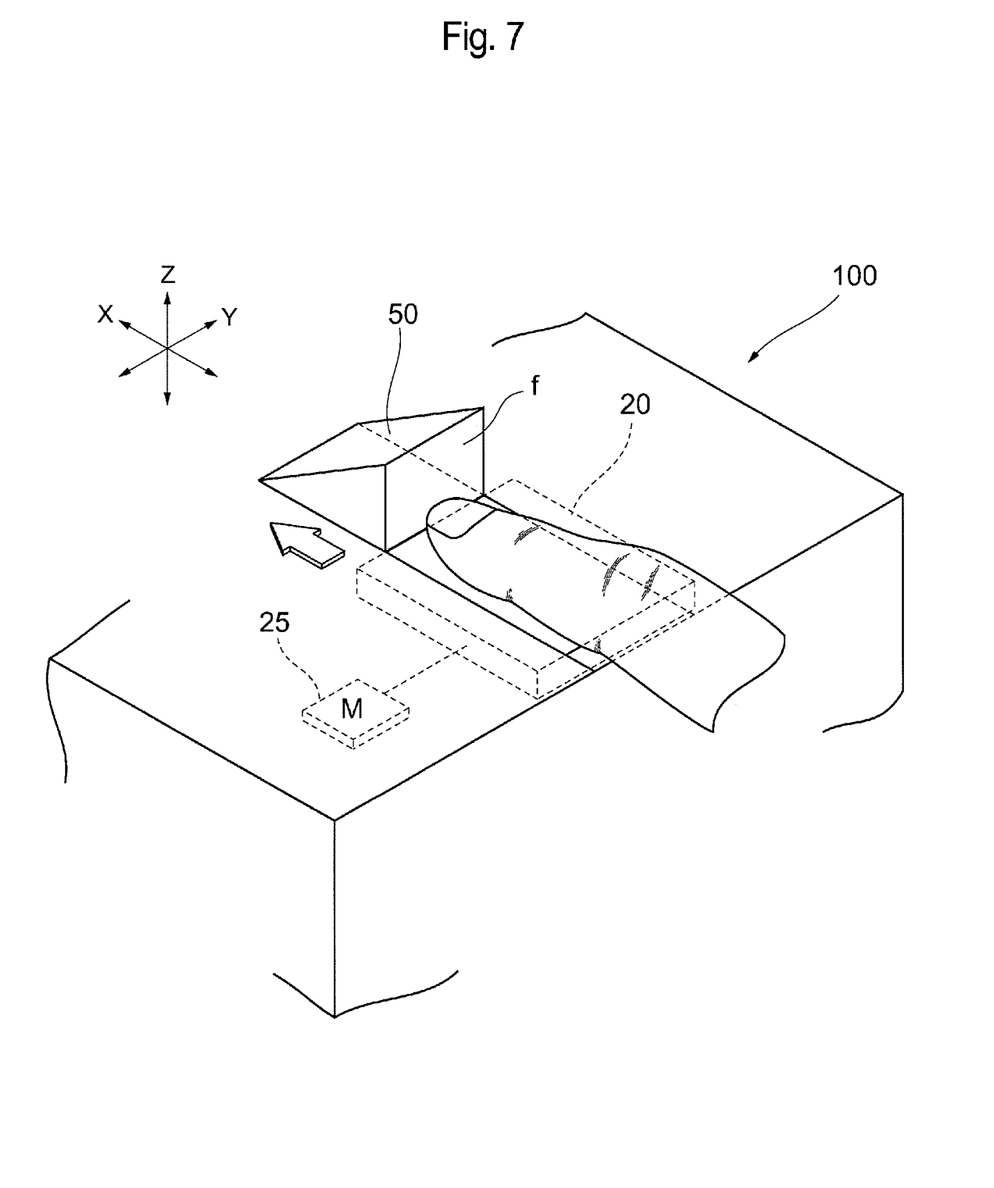
FIG. 7 is a diagram illustrating the guide part according to a modified example.

Accordingly, when the sensor surface 20 is to be moved or rotated, the guide part 50 should be set so that the finger will not move or rotate pursuant to the movement or rotation of the sensor surface 20. For example, when moving the sensor surface 20 in a direction toward the fingertip, the guide part 50 may be provided so that the fingertip comes into contact with a front face f of the guide part 50 as shown in FIG. 7; that is, the guide part 50 should be provided as an extension of the movement locus of the sensor surface 20 for fixing the finger placed on the sensor surface 20.

Figure 8:
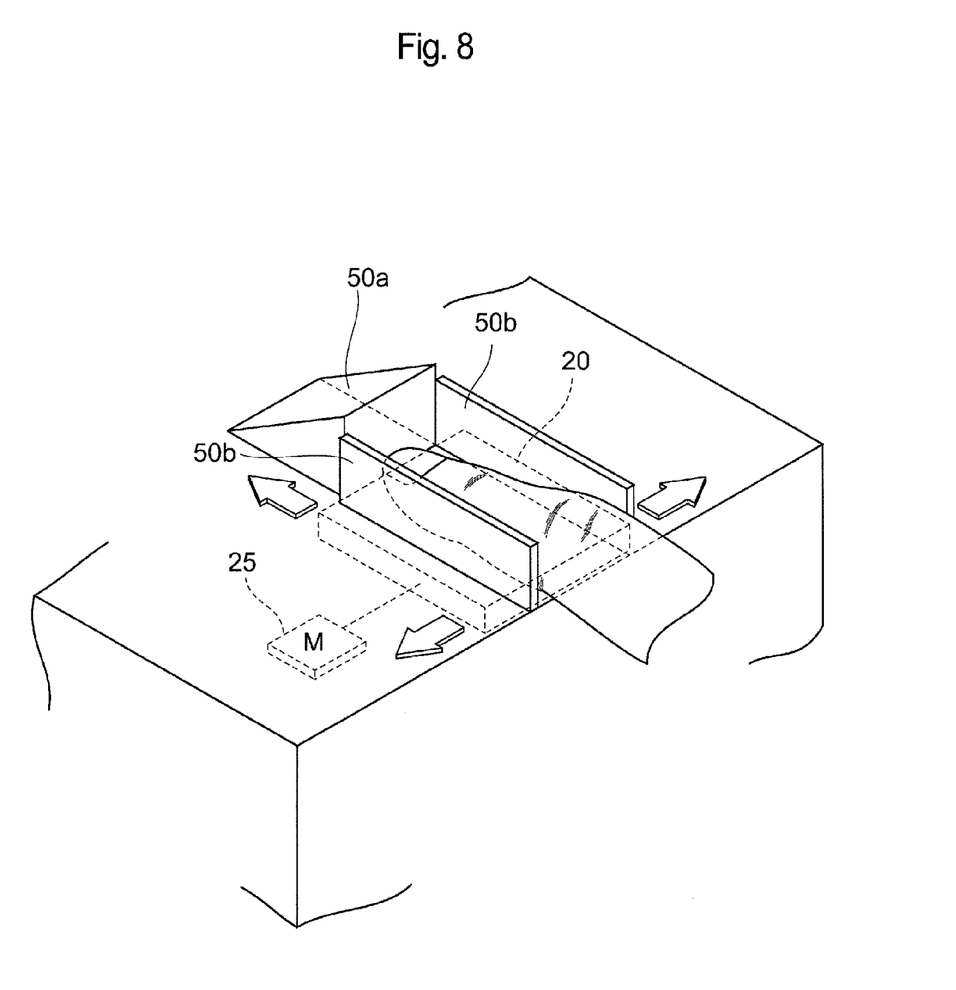
FIG. 8 is a diagram illustrating the guide part according to a modified example.

Moreover, as shown in FIG. 8, a first guide part 50a may be provided so that the fingertip will come into contact therewith, and second guide parts 50b may be provided so that the lateral face of the finger will come into contact therewith. When the first guide part 50a and the second guide part 50b are provided, for instance, the sensor surface 20 is moved in the direction toward the fingertip, and the fingerprint image after such move (hereinafter referred to as the "first movement fingerprint image") is acquired. Subsequently, the sensor surface 20 is moved in the lateral direction (for instance, to the left lateral face) of the finger, and the fingerprint image after such move (hereinafter referred to as the "second movement fingerprint image") is acquired. Subsequently, the fingerprint image before the sensor surface 20 is moved and the first movement fingerprint image are compared, and the fingerprint image before the sensor surface 20 is moved and the second movement fingerprint image are compared, respectively, and whether the determination object T is a fake-finger or a real finger can also be determined based on both comparison results.

Figure 9:
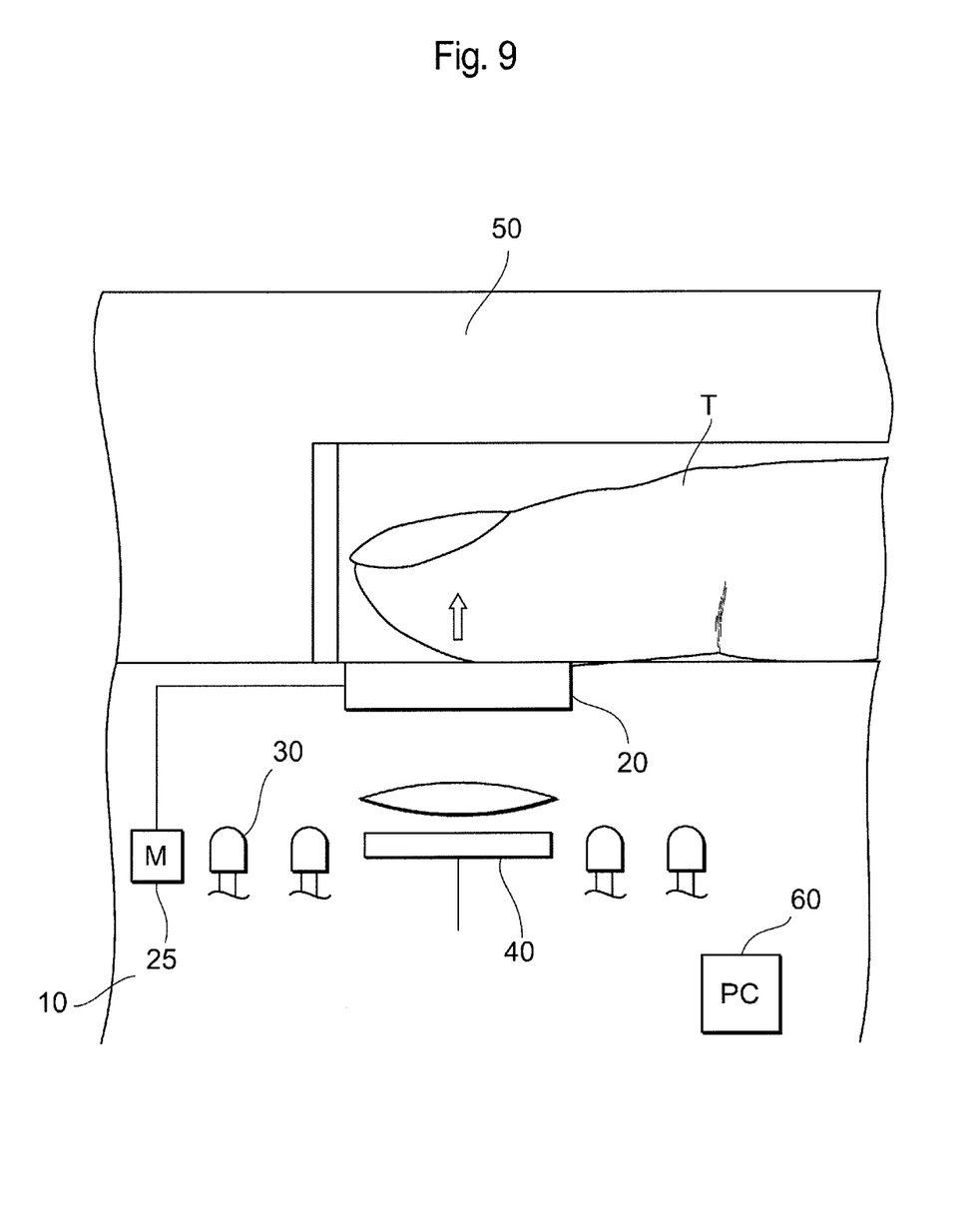
FIG. 9 is a diagram illustrating the guide part according to a modified example.

In addition, when the sensor surface 20 is moved in the vertical direction of the finger, a guide part 50 which covers the entire finger of the test subject as shown in FIG. 9 may also be provided.

Figure 10:
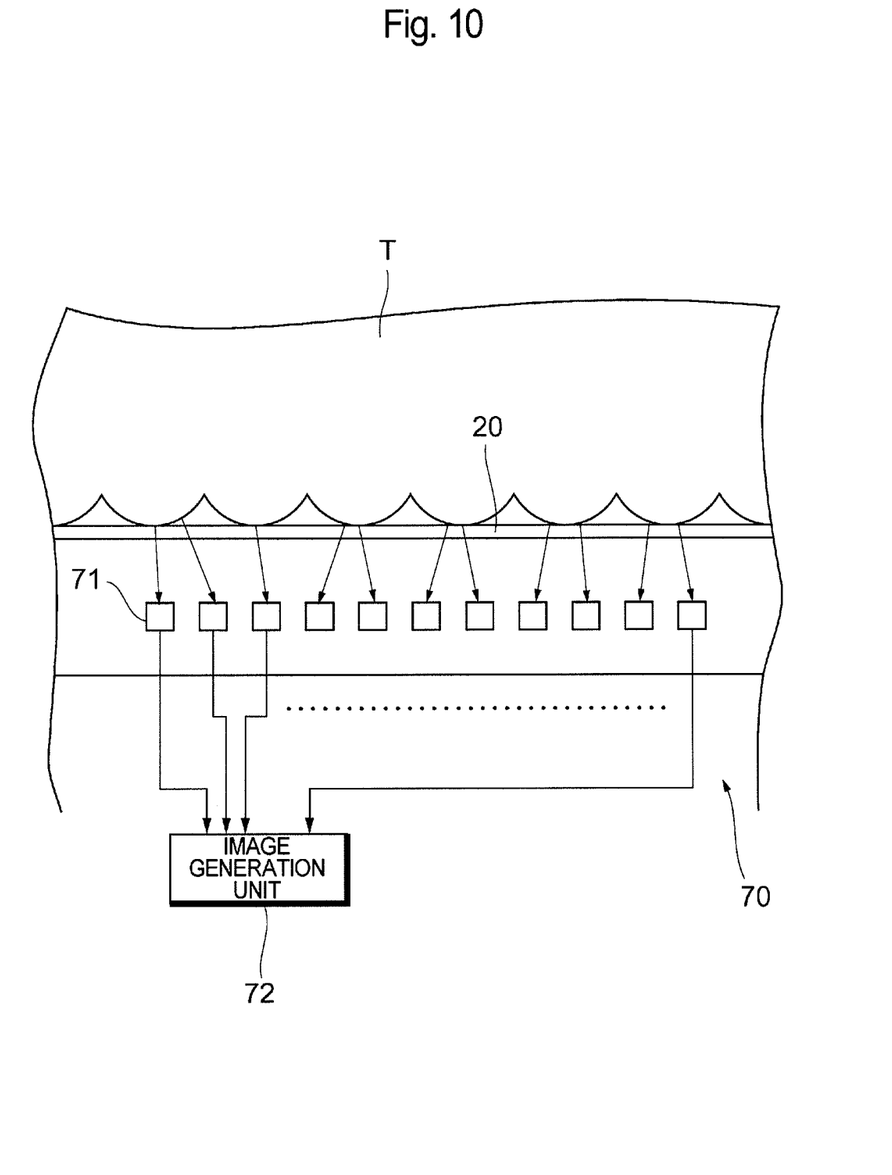
FIG. 10 is a diagram showing the configuration of the capacitance sensor according to a modified example.

(2) Moreover, the foregoing embodiment explained a case of acquiring the fingerprint images by using an optical sensor comprising the light source 30 and the imaging device 40, but a capacitance sensor 70 may also be used. FIG. 10 is a diagram showing the principle of the capacitance sensor 70.

Unlike an optical sensor, the capacitance sensor 70 does not require the arrangement of optical components or preparation of light paths, and this sensor yields advantages in that the sensor can be manufactured in compact form and with low cost. With the capacitance sensor 70, the sensor surface 20 is covered with a protective film, and a plurality of internal electrodes 71 embedded in the sensor are arranged below the protective film. The respective internal electrodes 71 are connected to the image generation unit 72. In the capacitance sensor 70 configured as described above, when a finger as the determination object T comes into contact with the sensor surface, charge according to the distance between the finger surface and the internal electrode 71 is accumulated in the electrodes. The image generation unit 72 obtains fingerprint images by measuring the impedance according to the capacitance. Note that the movement of the sensor surface 20 by using the movement mechanism 25 is the same as the foregoing embodiment, and additional explanation is omitted.

A case of using the capacitance sensor 70 was described above, but the present invention also be applied to a non-optical sensor, a sensor of a holographic system, a sensor of a luminescence system, a sensor of an ultrasound system, a pressure-sensitive sensor, a heat-sensitive sensor and the like.

(3) Moreover, the foregoing embodiment and the foregoing modified example explained cases of using the fingerprint of a finger to determine whether or the determination object T is real. However, the present invention can also be applied to cases of using a palm print of the palm of one's hand to determine whether or not the determination object T is real.

Moreover, the order of the steps of the respective processes shown in this embodiment can be arbitrarily changed or executed in parallel to the extent that there is no inconsistency in the processing contents. In addition, the terms "means" as used in the present specification and the like does not simply refer to physical means, and also includes cases where the function of such means is realized by software. Furthermore, the functions of one means may be realized by two or more physical means, and the functions of two or more means may be realized by one physical means. Moreover, the software according to the present invention can be installed or loaded in a computer through various recording mediums such as a CD-ROM or DVD-ROM or other optical disks, a magnetic disk, or a semiconductor memory, or by being downloaded via a communication network or the like.

This application relates to and claims priority from Japanese Patent Application No. 2009-277655, filed on Dec. 7, 2009, the entire disclosure of which is incorporated herein by reference.

The present invention was explained above with reference to the embodiments, but the present invention is not limited to the foregoing embodiments. The configuration and details of the present invention can be variously modified by those skilled in the art within the scope of the present invention.

The fake-finger determination device according to the present invention can acquire fingerprint images that are required for fake-finger determination with a single input operation, and is suitable for improving the user-friendliness and the determination accuracy of a fake-finger.

EXPLANATION OF REFERENCE NUMERALS

100 . . . fake-finger determination device, 10 . . . housing, 20 . . . sensor surface, 25 . . . movement mechanism, 30 . . . light source, 40 . . . imaging device, 50 . . . guide part, 60 . . . computer, 61 . . . placement detection means, 62 . . . image acquisition means, 63 . . . movement control means, 64 . . . fake-finger determination means.

What is claimed is:

1. A determination object sensing device, comprising:
    a moving unit for moving a sensor surface, on which a finger as a determination object is placed, the finger being in a fixed state at a predetermined speed in a predetermined amount in a horizontal direction of the sensor surface;
    a sensing unit for acquiring fingerprint images of the finger before and after the sensor surface is moved;
    a derivation unit for obtaining a deformation level of the fingerprint before and after the sensor surface is moved based on two types of fingerprint images obtained by the sensing unit;
    a storage unit for storing a deformation threshold related to the deformation level of the fingerprint to determine whether the finger on the sensor surface is a real finger or a fake-finger; and
    a determination unit for determining whether the finger placed on the sensor surface is a real finger or a fake-finger based on comparison results of the deformation level of the fingerprint obtained by the derivation unit and the deformation threshold.

2. The fake-finger determination device according to claim 1,
    wherein the moving unit moves or rotates the sensor surface in a longitudinal direction of the finger, a lateral direction of the finger, or a direction that is perpendicular to the longitudinal direction of the finger.

3. The fake-finger determination device according to claim 1,
    wherein a guide part for fixing the finger placed on the sensor surface is provided as an extension of a movement locus of the sensor surface.

4. The fake-finger determination device according to claim 3,
    wherein the guide part is provided to either a position to which a tip of the finger placed on the sensor surface comes into contact, or a position to which a lateral face of the finger placed on the sensor surface comes into contact.

5. A fake-finger determination method, comprising:
    a step of acquiring a fingerprint image of a finger, which is placed as a determination object on a sensor surface, before the sensor surface is moved;
    a step of moving the sensor surface the finger being in a fixed state at a predetermined speed in a predetermined amount in a horizontal direction of the sensor surface;
    a step of acquiring a fingerprint image of the finger placed on the sensor surface after the sensor surface is moved;
    a step of obtaining a deformation level of the fingerprint before and after the sensor surface is moved based on two types of fingerprint images before and after the sensor surface is moved; and
    a step of comparing the obtained deformation level of the fingerprint and a deformation threshold relating to the deformation level of the fingerprint, and determining whether the finger placed on the sensor surface is a real finger or a fake-finger based on comparison results.

* * * * *